US012619945B2

(12) United States Patent
MacTiernan et al.

(10) Patent No.: US 12,619,945 B2
(45) Date of Patent: May 5, 2026

(54) FLEXIBLE ASSIGNMENT OF MEDIA ADVERTISING ORDERS TO BROADCAST INVENTORY

(71) Applicant: iHeartMedia Management Services, Inc., San Antonio, TX (US)

(72) Inventors: Daniel N. MacTiernan, Ocean City, NJ (US); Amit Aggarwal, New York, NY (US); James Liao, New York, NY (US); Brian Kaminsky, Hewlett, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 556 days.

(21) Appl. No.: 17/530,602

(22) Filed: Nov. 19, 2021

(65) Prior Publication Data

US 2022/0076199 A1 Mar. 10, 2022

Related U.S. Application Data

(63) Continuation of application No. 16/714,998, filed on Dec. 16, 2019, now Pat. No. 11,182,741, which is a continuation of application No. 15/257,027, filed on Sep. 6, 2016, now Pat. No. 10,510,039.

(51) Int. Cl.
| | |
|---|---|
| *G06F 17/00* | (2019.01) |
| *G06Q 10/087* | (2023.01) |
| *G06Q 20/14* | (2012.01) |
| *G06Q 30/0242* | (2023.01) |

(52) U.S. Cl.
CPC .......... *G06Q 10/087* (2013.01); *G06Q 20/14* (2013.01); *G06Q 30/0242* (2013.01)

(58) Field of Classification Search
CPC ... G06Q 10/087; G06Q 20/14; G06Q 30/0242
See application file for complete search history.

(56) References Cited

U.S. PATENT DOCUMENTS

| | | | | |
|---|---|---|---|---|
| 8,069,097 B2 * | 11/2011 | Patrick | ................. | G06Q 10/087 |
| | | | | 705/28 |
| 8,155,990 B2 * | 4/2012 | Chickering | ........ | G06Q 30/0201 |
| | | | | 705/28 |
| 8,484,676 B1 * | 7/2013 | Narsimhan | ........ | H04N 21/4126 |
| | | | | 725/23 |
| 9,230,234 B2 * | 1/2016 | Danzig | ................. | G06Q 10/087 |
| 2003/0154142 A1 * | 8/2003 | Ginsburg | ........... | G06Q 30/0206 |
| | | | | 705/28 |

(Continued)

*Primary Examiner* — Talia F Crawley
(74) *Attorney, Agent, or Firm* — Edward J. Marshall

(57) ABSTRACT

An automated planning system obtains media advertising order specifications associated with media placement orders, wherein the media advertising order specifications include flexibility attributes associated with media items referenced in the media placement orders. The planning system generates an orders table including order information associated with individual orders, an inventory table including inventory information associated with individual inventory items, and an association table including association scores indicating levels of association between the individual inventory items and the individual orders, wherein the association scores are based on the flexibility attributes. The media placement orders are booked into a plan lineup based, at least in part, on the association scores.

16 Claims, 13 Drawing Sheets

(56) References Cited

U.S. PATENT DOCUMENTS

| | | | |
|---|---|---|---|
| 2004/0236794 A1* | 11/2004 | Shane Fox | G06Q 30/06 |
| 2007/0039018 A1* | 2/2007 | Saslow | H04N 21/8352 |
| | | | 725/19 |
| 2007/0130009 A1* | 6/2007 | Steelberg | H04H 60/33 |
| | | | 705/14.46 |
| 2009/0024554 A1* | 1/2009 | Murdock | G06Q 30/0276 |
| | | | 706/48 |
| 2009/0132346 A1* | 5/2009 | Duggal | G06Q 30/0204 |
| | | | 705/7.33 |
| 2009/0204588 A1* | 8/2009 | Hosono | G06F 16/319 |
| 2009/0222316 A1* | 9/2009 | Boinepalli | G06Q 30/00 |
| | | | 705/7.29 |
| 2009/0302108 A1* | 12/2009 | Patrick | G06Q 10/087 |
| | | | 235/385 |
| 2011/0251875 A1* | 10/2011 | Cosman | G06Q 30/0277 |
| | | | 705/7.31 |
| 2012/0042338 A1* | 2/2012 | Kitts | H04N 21/435 |
| | | | 725/35 |
| 2012/0158526 A1* | 6/2012 | Cosman | G06Q 30/0244 |
| | | | 705/28 |
| 2013/0117163 A1* | 5/2013 | Danzig | G06Q 10/087 |
| | | | 705/28 |
| 2014/0143803 A1* | 5/2014 | Narsimhan | H04N 21/47217 |
| | | | 725/34 |
| 2014/0379427 A1* | 12/2014 | Fox | G06Q 20/145 |
| | | | 705/7.31 |
| 2016/0301984 A1* | 10/2016 | MacTiernan | H04N 21/26258 |
| 2017/0262865 A1* | 9/2017 | Littlejohn | H04N 21/812 |
| 2021/0097580 A1* | 4/2021 | Kamireddy | H04N 21/812 |

* cited by examiner

Inventory Selection

Traffic, Billing Workflow

400

Hardware executing application

File/Data

AR Billing System 450

Order entry and fulfillment (as run) data sent to billing

Traffic Systems 420

Traffic Log 435

Playout Systems 410

Local Media Stations

Order Delivery System 475

Verification of spots airing (fulfillment) data

Planning System 473

Plan Lineup CSV

425

Submission Summary Chart

500

| Advertiser | Bank |
| --- | --- |
| Product | Transparency |
| Demo | A25-54 |
| Flight Dates | 2/29-3/21 |
| Total GRP's | 3/20/00 |
| Total Cost | 5/9/32 |
| Total CPP | 5/27/30 |

| Lineup (Flight Weeks) | Submitted Book | ACT1 Code | Weekly GRP's | Weekly Cost | CPP | GIMP's | Spots | Stations on Plan |
| --- | --- | --- | --- | --- | --- | --- | --- | --- |
| 2/29/16 | Spring 15 | WF24G | 24.0 | $264,000 | $11,000 | 30,333,800 | 4,762 | 215 |
| 3/7/16 | Spring 15 | WF8G | 8.0 | $85,200 | $10,650 | 10,094,800 | 1,757 | 198 |
| 3/14/16 | Spring 15 | WF20G | 20.0 | $220,000 | $11,000 | 25,246,000 | 4,054 | 220 |

| Daypart Percentages | | | |
| --- | --- | --- | --- |
| AMD | MID | PMD | Wknd |
| 16% | 32% | 12% | 40% |
| 18% | 29% | 13% | 40% |
| 17% | 30% | 13% | 40% |

| Market GRPs | #1-10 | #11-20 | #21-30 | #31-40 | Rest | Total |
| --- | --- | --- | --- | --- | --- | --- |
| M-F 6a-10a | 2.61 | 2.74 | 3.96 | 3.28 | 6.69 | 4.29 |
| M-F 10a-3p | 7.92 | 8.18 | 10.22 | 9.38 | 9.26 | 8.77 |
| M-F 3p-7p | 2.53 | 2.86 | 3.90 | 3.88 | 5.06 | 3.73 |
| Sa-Su 6a-7p | 16.73 | 14.48 | 10.78 | 6.40 | 5.75 | 11.09 |
| Total | 29.79 | 28.27 | 28.86 | 22.94 | 26.76 | 27.88 |
| Market Index | 107% | 101% | 104% | 82% | 96% | 100% |

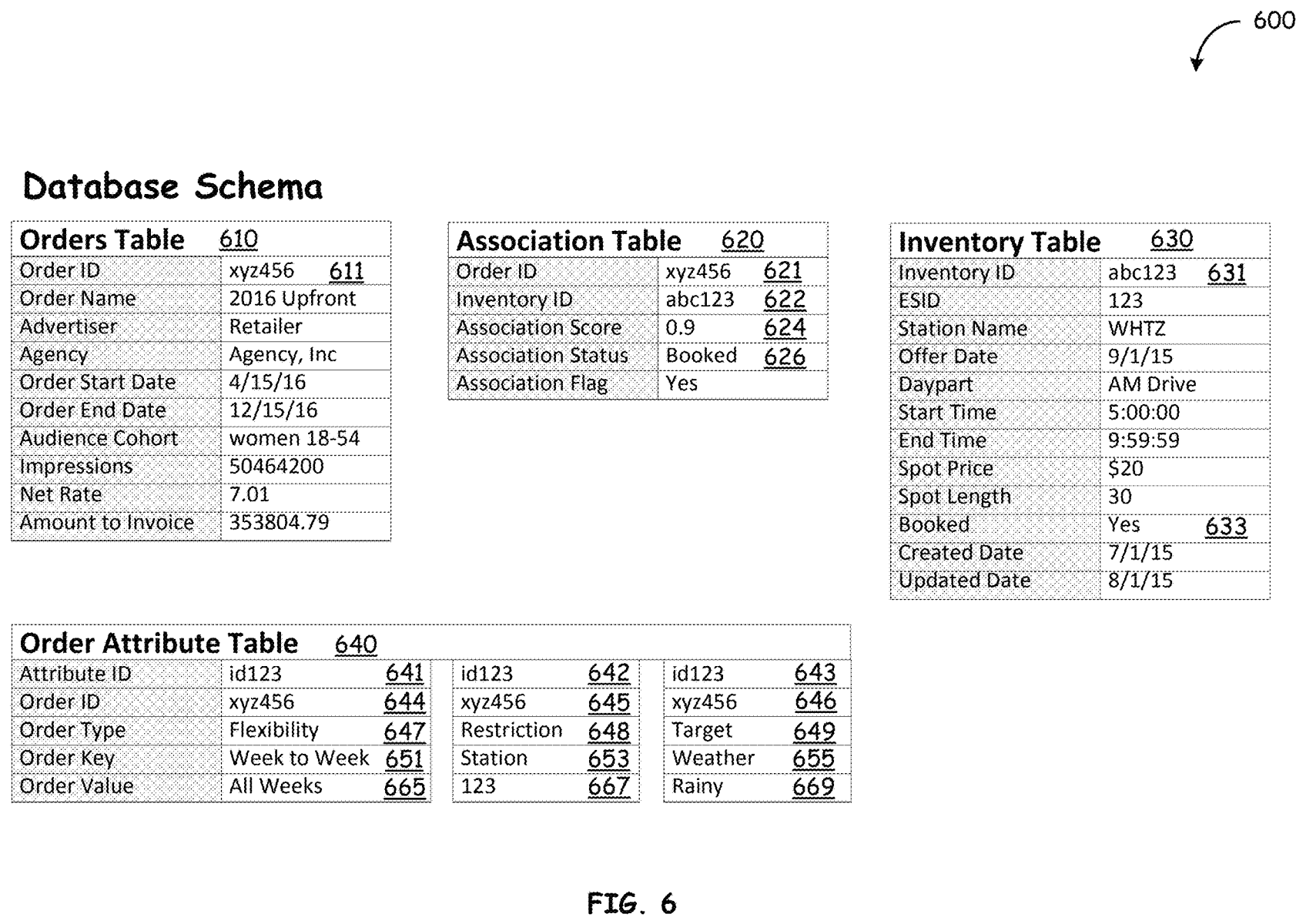

Database Schema

Orders Table 610

| | |
|---|---|
| Order ID | xyz456   611 |
| Order Name | 2016 Upfront |
| Advertiser | Retailer |
| Agency | Agency, Inc |
| Order Start Date | 4/15/16 |
| Order End Date | 12/15/16 |
| Audience Cohort | women 18-54 |
| Impressions | 50464200 |
| Net Rate | 7.01 |
| Amount to Invoice | 353804.79 |

Association Table 620

| | |
|---|---|
| Order ID | xyz456   621 |
| Inventory ID | abc123   622 |
| Association Score | 0.9   624 |
| Association Status | Booked   626 |
| Association Flag | Yes |

Inventory Table 630

| | |
|---|---|
| Inventory ID | abc123   631 |
| ESID | 123 |
| Station Name | WHTZ |
| Offer Date | 9/1/15 |
| Daypart | AM Drive |
| Start Time | 5:00:00 |
| End Time | 9:59:59 |
| Spot Price | $20 |
| Spot Length | 30 |
| Booked | Yes   633 |
| Created Date | 7/1/15 |
| Updated Date | 8/1/15 |

Order Attribute Table 640

| | | | |
|---|---|---|---|
| Attribute ID | id123   641 | id123   642 | id123   643 |
| Order ID | xyz456   644 | xyz456   645 | xyz456   646 |
| Order Type | Flexibility   647 | Restriction   648 | Target   649 |
| Order Key | Week to Week   651 | Station   653 | Weather   655 |
| Order Value | All Weeks   665 | 123   667 | Rainy   669 |

FIG. 6

New – Optimization runs against all inventory

| | Early Morning | | | | Drive Times, Mid Day | | | | Evening, Night | | |
|---|---|---|---|---|---|---|---|---|---|---|---|
| | Day Part 1 | Day Part 2 | Day Part 3 | Day Part 4 | Day Part 5 | Day Part 6 | Day Part 7 | Day Part 8 | Day Part 9 | Day Part 10 | |
| Station 1 | 0.8 | 0.8 | 0.8 | 0.9 | 0.9 | 0.8 | 0.8 | 0.8 | 0.8 | 0.4 | |
| Station 2 | 0.4 | 0.8 | 0.8 | 0.9 | 0.9 | 0.8 | 0.8 | 0.8 | 0.8 | 0.8 | |
| Station 3 | 0.4 | 0.4 | 0.4 | 0.9 | 0.9 | 0 | 0.4 | 0.3 | 0.4 | 0.4 | |
| Station 4 | 0.4 | 0.3 | 0.4 | 0.9 | 0.9 | 0 | 0.3 | 0.4 | 0.4 | 0.4 | |
| Station 5 | 0.4 | 0.3 | 0.4 | 0.9 | 0.9 | 0.4 | 0.3 | 0.4 | 0.3 | 0.4 | |
| Station 6 | 0.3 | 0 | 0.4 | 0.9 | 0.9 | 0 | 0.3 | 0.3 | 0.4 | 0.4 | |
| Station 7 | 0.4 | 0.3 | 0.3 | 0.9 | 0.9 | 0.3 | 0.3 | 0.3 | 0.4 | 0.3 | |
| Station 8 | 0.4 | 0.4 | 0.4 | 0.9 | 0.9 | 0 | 0.4 | 0.3 | 0.4 | 0.3 | |
| Station 9 | 0.3 | 0.3 | 0.6 | 0.9 | 0.9 | 0.6 | 0.6 | 0.6 | 0.6 | 0.4 | |
| Station 10 | 0.6 | 0.6 | 0.6 | 0.9 | 0.9 | 0.6 | 0.6 | 0.6 | 0.3 | 0.4 | |

| | |
|---|---|
| Order A | Order A is flexible by day part and station, buyer wants impressions, low price |
| Order B | Order B is flexible by day part and station, buyer wants impressions, low price |
| Order C | Order C is strict, only wants two specific stations, higher price |
| Order D | Order D is strict, only wants two specific day parts, even higher price |
| Order E | Order E is targeting rain, running on 2 stations that typically rain, high price |

FIG. 7

Weighted Associations, Optimization Against Previous Associations

Continuous Optimization, Reevaluation of Association for Pacing

Continuous Optimization, Reevaluation Using Real Time Data

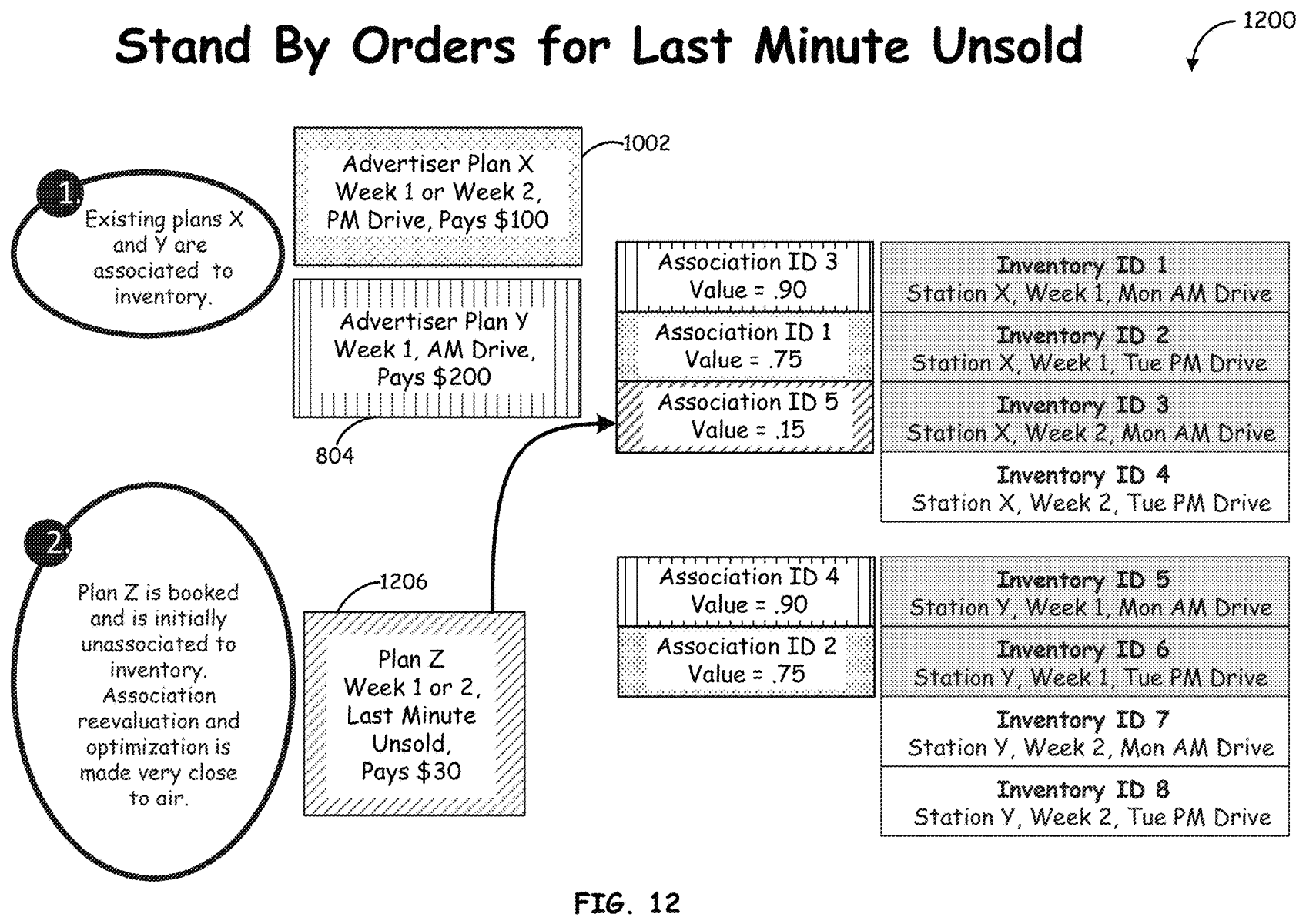

Stand By Orders for Last Minute Unsold

1200

Advertiser Plan X
Week 1 or Week 2,
PM Drive, Pays $100
1002

Advertiser Plan Y
Week 1, AM Drive,
Pays $200
804

Plan Z
Week 1 or 2,
Last Minute
Unsold,
Pays $30
1206

Association ID 3
Value = .90

Association ID 1
Value = .75

Association ID 5
Value = .15

Association ID 4
Value = .90

Association ID 2
Value = .75

Inventory ID 1
Station X, Week 1, Mon AM Drive

Inventory ID 2
Station X, Week 1, Tue PM Drive

Inventory ID 3
Station X, Week 2, Mon AM Drive

Inventory ID 4
Station X, Week 2, Tue PM Drive

Inventory ID 5
Station Y, Week 1, Mon AM Drive

Inventory ID 6
Station Y, Week 1, Tue PM Drive

Inventory ID 7
Station Y, Week 2, Mon AM Drive

Inventory ID 8
Station Y, Week 2, Tue PM Drive

1. Existing plans X and Y are associated to inventory.

2. Plan Z is booked and is initially unassociated to inventory. Association reevaluation and optimization is made very close to air.

FIG. 12

FLEXIBLE ASSIGNMENT OF MEDIA ADVERTISING ORDERS TO BROADCAST INVENTORY

CROSS REFERENCE TO RELATED PATENTS

The present U.S. Utility Patent application claims priority pursuant to 35 U.S.C. § 120 as a continuation of U.S. Utility application Ser. No. 16/714,998 entitled "DYNAMIC ASSIGNMENT OF MEDIA ADVERTISING ORDERS TO BROADCAST INVENTORY," filed Dec. 16, 2019, scheduled to issue as U.S. Pat. No. 11,182,741 on Nov. 23, 2021, which is a continuation of U.S. Utility application Ser. No. 15/257,027 entitled "DYNAMIC ASSIGNMENT OF MEDIA ADVERTISING ORDERS TO BROADCAST INVENTORY," filed Sep. 6, 2016, now U.S. Pat. No. 10,510,039 on Dec. 17, 2019, which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to media broadcasting, and more particularly to assigning media advertising orders to any combination of previously booked and currently un-booked broadcast inventory based on association scores indicating assignment flexibility.

2. Description of Related Art

Media stations can broadcast media content to end-users via FM, AM, Television, Cable, Satellite, or the Internet. Some media stations are "commercial free," but require end-users to pay a periodic fee to receive that station's broadcast or stream. Other media stations broadcast content without charge to the end-users, but receive revenue from the sale of broadcast time, commonly referred to as "inventory."

Various automated inventory management systems are available, and these systems typically map orders to available inventory using traditional factors such as demo/price efficiency, market and station balance, and fair and equal rotation. The mapping performed by current systems is generally a simple binary association, and once assigned to a unit of inventory, the mapping is fixed, and cannot change unless the automated system is bypassed, and manual intervention is taken. The mapping of orders to inventory is performed on a first-come, first-served basis, and is generally performed at the time a new order is placed. Thus, once an order is mapped to a particular unit of inventory, the system makes that unit of inventory unavailable for later-submitted orders.

Additionally, conventional media advertising is based on finite and static data sets. The two primary buyer/seller processes, referred to as planning and campaign copy splitting, are generally third party audience ratings, which are estimates of a listening audience, an estimate of listening audience), and station attributes such as market, format, and time of day. The third party ratings generally change only twice a year, and in most cases, broadcasters must manually approve each proposed advertising plan.

Furthermore, proper attribution of advertising can be difficult to demonstrate. For example, if a person hears an advertisement on the radio in his car, he may go home and search for the brand on the Internet, where an advertisement is displayed. In some such cases, the Internet advertisement is given credit for the exposure without taking into account that the radio advertisement should have received at least partial credit for the exposure.

A broadcast network lineup, sometimes referred to as a plan or schedule is generally considered to be a contractual order that the seller and buyer have transacted. It is usually a list of stations, weeks, day parts, and number of spots that the seller will air on behalf of the buyer. Originally broadcasting network lineups were referred to as pre-defined "wired networks." And to make buying advertising time easier, these wired networks always offered the same lineup, and by extension the same audience. Eventually, a new network product was created to accommodate variation-"unwired networks". Unwired networks are a customized, unique network plan based on the buyer's specification, or "spec". A spec or specification is the set of goals the buyer wants to achieve from the media plan, for example the total budget, desired number of impressions, the time period, any station format exclusions, etc. In conventional systems, however, the spec is defined against the same finite and static data sets-third party audience and station attributes.

In both cases (wired and unwired), once the plan (station lineup) is booked or sold, it cannot change—the "spend" is guaranteed and will run as initially defined. This is a traditional limitation because with finite and static data, it is impracticable to change the plan's station lineup during an advertising campaign. Furthermore, in both cases (wired and unwired), the campaign copy rotation is limited to the station's contextual attributes-market, format, time. Besides being limited, it is operationally expensive to manage complicated copy rotation rules.

As discussed above, conventional media inventory sales and management systems, while adequate in many respects, are less than perfect.

BRIEF SUMMARY OF THE INVENTION

The present invention is directed to apparatus and methods of operation that are further described in the following Brief Description of the Drawings, the Detailed Description of the Invention, and the claims. Various features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a diagram illustrating a submission summary chart, in accordance with various embodiments of the present disclosure;

FIG. 6 is a diagram illustrating a database schema associating orders with inventory, in accordance with various embodiments of the present disclosure;

FIG. 7 is a table illustrating booked and unbooked inventory along with flexibility attributes associated with the inventory, in accordance with various embodiments of the present disclosure;

FIGS. 8-12 are diagrams illustrating various order-to-inventory association scenarios, in accordance with various embodiments of the present disclosure.

DETAILED DESCRIPTION OF THE INVENTION

Figure 1:
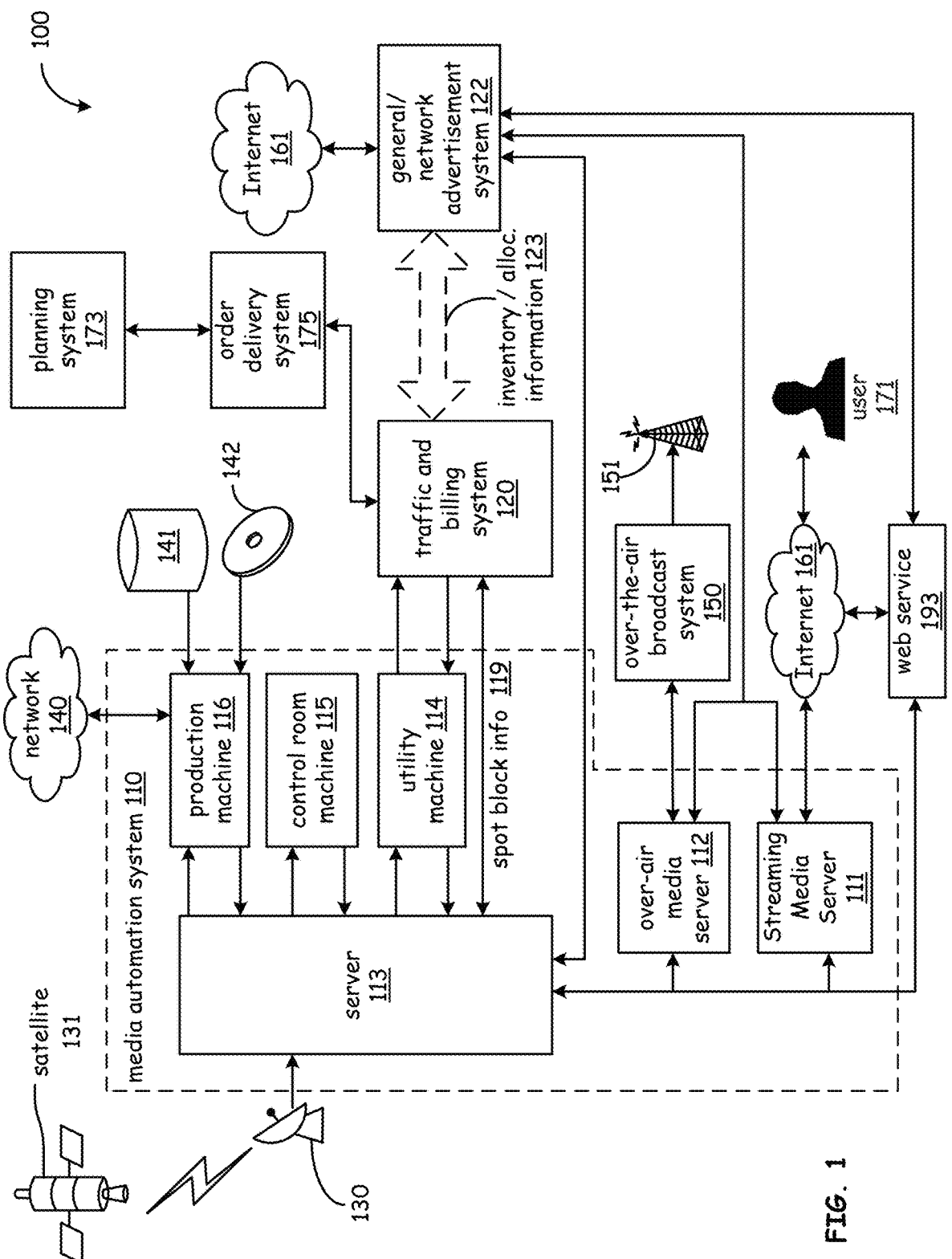
FIG. 1 is a schematic block diagram of a broadcasting system in accordance with various embodiments of the present disclosure.

In various embodiments discussed herein, a planning system receives media advertising order specifications that include flexibility attributes, which indicate how much flexibility a broadcaster has in scheduling broadcast time to fulfill the media advertising orders. For example, a flexibility attribute can specify that the order is fully or partially flexible with regard to week, day of the week, time, daypart, station, or otherwise. In some embodiments, the flexibility attribute can be converted to a number on a scale between $X_1$ and $X_2$, where one end of the scale represents maximum flexibility with regard to scheduling, the other end of the scale represents minimum flexibility with regard to scheduling, and numbers between $X_1$ and $X_2$ represent varying degrees or types of flexibility.

The planning system can obtain available inventory from a traffic and billing system employed by an automated broadcast system, where the available inventory can include all future inventory, regardless of whether the future inventory has already been booked, or remains unbooked. The planning system can use the flexibility attributes associated with the current order and with any orders previously booked into the future inventory, to alter the previous associations under the proper circumstances.

Consider, for example, a case where a new order is inflexible, and requires placement into a particular daypart, on a particular date, and on a particular station, but there is no unbooked inventory that matches the specifications of a new order. According to various embodiments of the present invention, if a previously booked inventory item would satisfy the new order's specifications, and is associated with a previous order that is flexible with regard to station, but not with regard to the daypart or the date, the association of the booked inventory item with the previous order can be removed, and replaced by an association with the new order. The previous order can then be re-associated with a different inventory item on a different station that meets the previous order's daypart and date requirements on a different station. By way of contrast, in currently known systems the new order would be left unfilled by the scheduling system, because the only future inventory item that satisfied the new order's specifications was already booked, and would not be identified as being an available inventory item.

After modifying the associations of the inventory item, the planning system can generate a non-guaranteed order including revised associations, and transmit that order to a media delivery system.

By using flexibility attributes associated with an order, the planning system can be responsible for modifying scheduled advertisement air times and stations based on generalized purchaser requirement. For example, an inventory purchaser may indicate that they want to achieve a specified market tier index, and leave the decision about how to achieve that market tier index to the broadcaster's planning system. In some embodiments employing flexibility attributes, the planning system can reevaluate and/or modify inventory-to-order associations on a continual basis, based on the flexibility attributes and the current progress towards satisfying the purchaser's criteria. Thus, if a highly flexible order has been re-associated to accommodate fewer flexible orders, up until the point of evaluation, and the evaluation indicates that at the current rate the flexible order will not reach a market tier index that satisfies the purchaser's requirements, the level of flexibility can be lowered to prevent the flexible order from continuously being "bumped" in favor of less flexible orders. The converse, i.e., increasing the flexibility attribute to make the order more flexible, can be performed if the order is significantly over performing with respect to the purchaser's requirements. In some embodiments, the evaluation can be based on feedback received from a media delivery system, radio attribution information received from a broadcaster, web service, or other source; user feedback, purchaser feedback, or the like.

In some implementations, initial association of an order to an inventory item can be delayed until occurrence of a trigger event is detected. For example, if a trigger event included in an event-targeted order specification indicates that the order is to be fulfilled exclusively upon occurrence of a particular weather event, the order may not be associated with an inventory item until the planning system receives information indicating that the specified weather event has occurred. At that point, the planning system can evaluate the flexibility of booked inventory items and, if appropriate, replace a previous association between one or more booked inventory items and previously scheduled orders with a new association to the event-targeted order. In some embodiments, this evaluation is not performed if unbooked inventory items are available.

Various embodiments of a media inventory sales and management system discussed herein, provide additional, dynamically updated inputs, to give the planner new exclusion/targeting criteria and/or give the booking agent algorithm an additional optimization criteria.

Yet other embodiments provide additional, dynamically updating inputs to the campaign copy rotation process, to permit copy splitting on real time environmental conditions or other real time insights Still other embodiments go beyond the traditional, static station context of format and market to provide ad planning and delivery systems with sufficient information to be aware of what shows are running during the day, which personalities are on-air, and what is being discussed.

Further embodiments provide dynamically updating pricing information to the inventory, so that a computing device programmed to implement a booking agent, can automatically attempt to optimize the yield on inventory to choose the best inventory placements (spots). The booking agent can also be adapted to add a premium to or discount the plan to account for inventory fragmentation, thereby eliminating the need for manual approvals.

In some embodiments, a media inventory sales and management system can provide plans that are not defined by a list of stations (the lineup) but are instead defined against the buyer's spec, which can itself be automated against a dynamic data set. In some such embodiments, every day, week or other time period, the booking agent can create a new station lineup, without being bound to the station lineup as it existed at the time an order was booked. For example, if the dynamic data feed created a plan against stations 1-100 for week one, the data feed may show that the desired audience has moved and is now best represented by stations 500-150 during week two. The media inventory sales and management system can change the plan for week 2, accordingly.

Media broadcasters generally know exactly when spots run on-air. In various embodiments, this data can be indexed against digital attribution measurements to calculate radio attribution. For example, a direct response advertiser may have a radio ad that asks, "go to website ABC or call XYZ". A website cookie and call tracking number can be measured to track activation against the market (geo) and time of air. This attribution data can be substantially immediately conveyed to the advertiser via a real-time updating website/dashboard.

In some embodiments, a system can employ a dynamically optimizing plan that uses an attribution data set as a criteria for adjusting the plan's audience and station lineup. In this manner, a media advertisement plan can automatically increase reach and frequency in those markets where attribution/activation is highest or lowest, depending on the advertiser's goals.

Unless otherwise explicitly limited or required by context, the terms "broadcast," "media broadcast," and derivations thereof used herein refer to transmission of content to more than one end user, and can include transmissions by terrestrial antennas, satellites, streaming media stations, and the like.

Referring to FIG. 1, a system 100 will be discussed according to various embodiments of the present disclosure. System 100 includes media automation system 110, for example a NexGen® automation system, which can control and automate various media broadcast functions; and traffic and billing system 120, for example a Viero® traffic system, which can provide control for various traffic and billing functions such as entering and editing orders, and scheduling spots. System 100 can also include planning system 173 and order delivery system 175, which can be used to book orders, establish non-binary associations between orders and inventory, re-evaluate order-to inventory associations, generate orders 225 (FIG. 2) that include the associations, and deliver those orders, sometimes referred to herein as non-guaranteed orders, to traffic and billing system 120 which can use the non-guaranteed orders to generate a log specifying particular items and to be broadcast and the placement of those items within the broadcast. Although illustrated as being separate from traffic and billing system 120 some or all of the functionality and/or structure of planning system 173 and order delivery system 175 can be incorporated into traffic and billing system 120.

System 100 can include over-the-air broadcast system 150, through which content can be broadcast via broadcast tower 151. System 100 can also include one or more communication networks, for example, Internet 161, which can be used to transmit or stream media content to user 171.

In various embodiments, system 100 can also include a web service 193, such as iHeart Radio®, which can obtain history, preference, operating condition feedback, playout confirmation, and other information, and provide some or all of that information to media automation system 110, to provide user 171 with tailored content. In various embodiments, web service 193 can interact with advertisement system 122, which can include a third party advertisement system, to provide advertisements tailored to user 171 based on either or both explicitly provided preferences and inferred preferences.

Various media sources can also be included in system 100, for example, individual source media 142, media database 141, programming from another market received via network 140, and programming transmitted by satellite 131, which can be received via satellite receiver 130. In some embodiments, although not explicitly illustrated, satellite 131 can broadcast content directly to user 171. Note that in some embodiments, over-the-air broadcasting can include both satellite-based over-the-air broadcasting and terrestrial over-the-air broadcasting.

System 100 may also include advertisement system 122, sometimes referred to as an external advertisement system, or a network advertisement system, which can be used for provisioning general advertisement content for streaming broadcast and over-the-air broadcast via the traffic and billing system 120, in addition to providing targeted or tailored advertising as requested by web service 193. The traffic and billing system 120 and the advertisement system 122 may communicate with each other, and/or with over-the-air audio server 112, streaming media server 111, and/or web service 193 to coordinate local and general advertisement content.

In general, traffic and billing system 120 can be used to provide control and monitoring of the sale and scheduling of spot blocks containing one or more spots, and to determine which spot blocks are to be played on which streaming and broadcast stations at particular times. This information can be provided in the form of a log file in some embodiments. Media automation system 110 can use server 113 to gather programming and media information from various sources, and combine that information with spot block information 119 to generate a log file indicating a substantially complete representation of which media and spots are to be broadcast. The log file and related information can be provided to both over-the-air audio server 112 for over-the-air broadcast, and to streaming media server 111 streaming broadcast.

Some or all of the content broadcast using over-the-air audio server 112 or streaming media server 111 can include primary and/or advertising content delivered by server 113. In at least some embodiments, content delivered by server 113 includes separate information to be embedded in a broadcast at or near the time of broadcast by over-the-air audio server 112 or over-the-air broadcast system 150. In other embodiments, the content delivered by server 113 can include pre-embedded information. In at least some embodiments, over-the-air audio server 112, replacement content server 111, or over-the-air broadcast system 150 can create, obtain, or embed their own content.

Media automation system 110 can also include production machine 116, which receives media content from network 140, media database 141, individual source media 142, control room machine 115, and utility machine 114, each of which can be connected to server 113. Media automation system 110 can also include streaming media server 111 and over-the-air audio server 112, which provides media content to over-the-air broadcast system 150. Server 113 can provide audio, images, video, or mixed media content to one or both of over-the-air audio server 112 and replacement content server 111. Note that even though audio servers are illustrated and discussed, the techniques and principles described herein can also be applied to images, video and mixed media content.

In at least one embodiment, one or more of the illustrated servers can be implemented as a virtual server implemented on the same hardware as another of the illustrated servers. In each case, however, implementation of a server requires the use of hardware, and general reference to a "server," unless otherwise explicitly stated or required by the context, includes hardware components used to implement the server functionality. Furthermore, various distributed processing techniques can be used to spread functionality of one or more of the illustrated servers across multiple different machines.

Traffic and billing system 120 is, in some embodiments, connected to server 113 via a utility machine 114. In other embodiments, traffic and billing system 120 may be connected to server 113 through other machines, for example a control room machine 115, production machine 116, or directly connected to server 113. In other embodiments, traffic and billing system 120 and server 113 can be included in a single machine, or collection of machines that are co-located or connected in a distributed fashion. In yet further embodiments, traffic and billing system 120 can include local instances or subsystems associated with one or more media stations, and a backend subsystem used to provide centralized control or services to each of the local instances or subsystems.

In various embodiments, spot block information 119 can include requests for identification of potential spots available for inclusion in an under-filled spot block, responses to such requests, bumped spot notifications, broadcast logs and lists, spot files, parameters related to available, unavailable, and potential spots, spot block parameters, ranks, conditional information, various status information related to spots, and the like.

Also, traffic and billing system 120 can be connected to advertisement system 122. Advertisement system 122 can, in various embodiments, operate to provide network inventory directly to media automation system 110 for broadcast in accordance with a broadcast log specifying inventory allocations 123 generated by the traffic and billing system 120. Traffic and billing system 120 can provide the broadcast log to server 113 of media automation system 110. In some embodiments, the broadcast log can include entries that specify spots reserved for playout of local inventory by media automation system 110, and placeholder, or network, entries specifying particular portions of spot blocks reserved for playout of network inventory by advertisement system 122.

Figure 2:
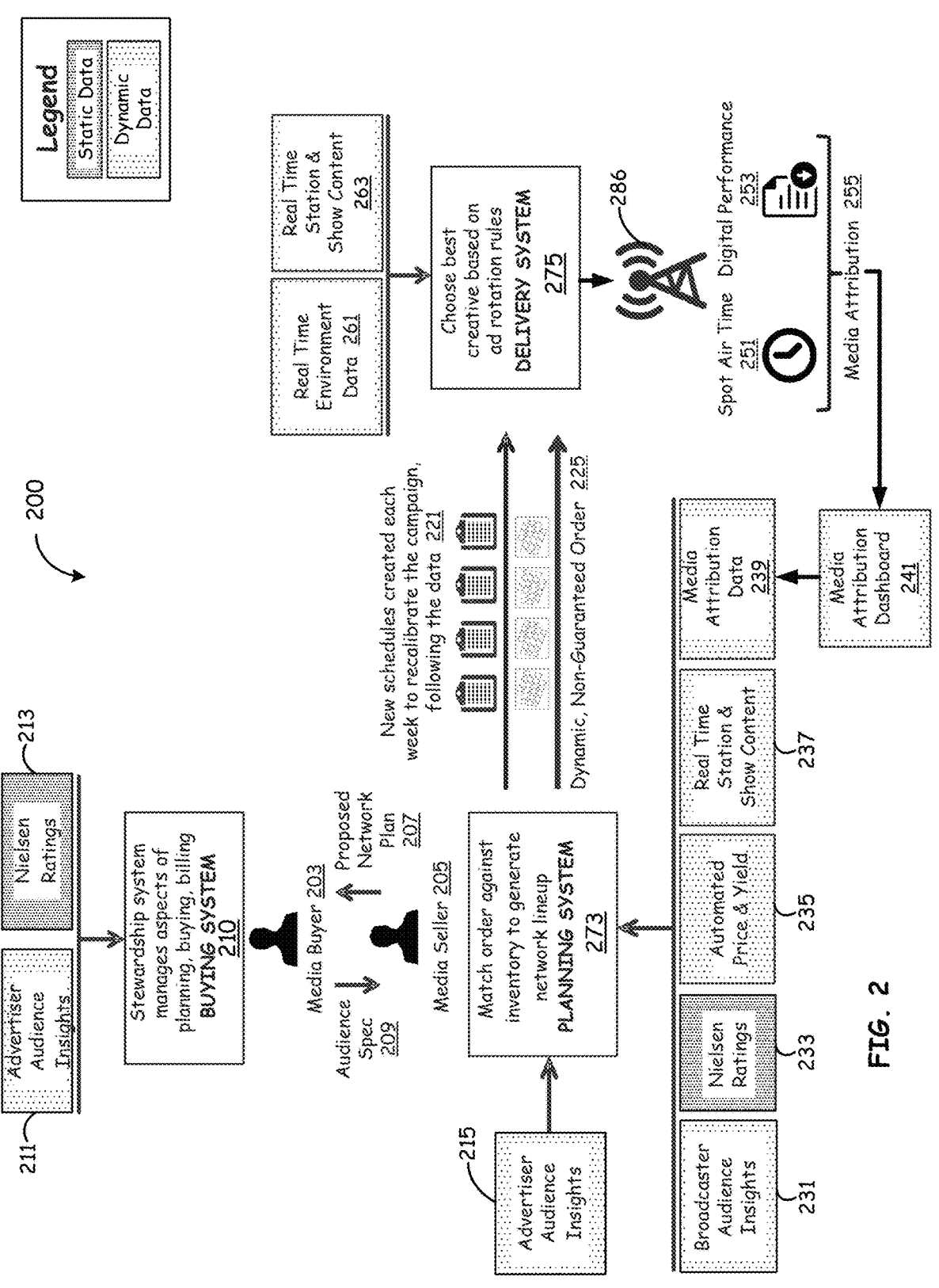
FIG. 2 is a diagram illustrating information flow within a media inventory sales and management system, in accordance with various embodiments of the present disclosure.

Referring next to FIG. 2, a diagram illustrating information flow within a media inventory sales and management system 200, will be discussed in accordance with various embodiments of the present disclosure. Media inventory sales and management system 200 can include buying system 210, planning system 273, delivery system 275, and media attribution dashboard 241. Buying system 210 can control and manage some or all aspects of planning, buying, and billing related to purchases of media inventory related to media buyer 203. Planning system 273 can match orders against inventory to generate proposed and final network plans, or lineups, by matching inventory to particular orders using flexibility attributes associated with those orders. The planning functions performed by buying system 210 can, in various embodiments, be different than the planning functions of planning system 273 in type, scope, and/or timing.

For example, buying system 210 can be used by media buyer 203 and/or a media seller 205 to obtain and provide information that aids media buyer 203 in making a purchasing decision. For example, buying system 210 can be used by media buyer 203 to provide one or more media advertising order specification, for example audience specification 209, to media seller 205. Likewise, buying system 210 can be used by media seller 205 to provide proposed network plan 207 to media buyer 203. In at least some embodiments, buying system 210 receives inputs, for example advertiser audience insights 211 and/or Nielsen ratings 213, and uses those inputs to assist media buyer 203 in determining audience specification 209.

In various embodiments, media advertising order specifications can include information specifying daypart percentage targets, gross rating point (GRP) targets, market index targets, target audience preferences and requirements, information indicating a length of campaign, and various flexibility attributes indicating whether the order is flexible with regard to daypart, station, week, day of the week, or the like. An order may, in some implementations, include information identifying one or more specific advertisement items, sometimes referred to as advertisement creatives, and flexibility attributes applicable to individual advertisement creatives. In other embodiments one or more flexibility attributes can be applied to the order as a whole. In some embodiments, a combination of order-wide flexibility attributes and individual-item flexibility attributes can be used.

Flexibility attributes used by planning system 273 can be based on, e.g., derived from, the flexibility attributes included in a media order specification. For example, flexibility values included in an order specification can be translated into a number between 0 and 1, with 0 indicating maximum flexibility, and 1 indicating minimum flexibility. In some instances, media buyer 203 may be asked to provide answers indicating yes or no flexibility in 4 different scenarios: 1) daypart flexibility; 2) flexibility on week; 3) flexibility on stations; and 4) flexibility on daypart, week, and station. If media buyer 203 selects scenario 4, the order can be assigned a flexibility attribute value of 1; selection of any one of scenarios 1, 2, or 3, can result in the order being assigned a flexibility attribute value of 25; if items 1 and 2 are selected the order can be assigned a flexibility attribute value of 0.5; and so on.

The value of a flexibility attribute assigned to either an individual item, to an entire order, or to some portion of an order, need not be linearly assigned as in this example, so that selection of some flexibility attributes is given more weight than others. For example, flexibility on station can be weighted to increase or decrease the overall flexibility attribute value by 0.3, rather than 0.25, and flexibility with regard to week is assigned a value of 0.2. In various embodiments, adjustment factors can be applied upon initial placement of an order and/or on a dynamic basis. Thus, for example, as the time remaining for order fulfillment decreases due to the passage of time, the value of the flexibility attribute used by planning system 273 can be decreased, or increased, to indicate less flexibility.

For example, planning system 273 can assign two different flexibility attribute values two orders having specifications indicating flexibility with regard to week, if the two orders are to be fulfilled over different time periods. Thus, in some embodiments, if a first order is to be fulfilled over a period of a month and is flexible with regard to daypart, and a second order to be fulfilled over a period of 3 weeks is also flexible with regard to daypart, the first order can be assigned a flexibility indicator value indicating higher flexibility than the flexibility indicator value assigned to the second order, because the second order has a shorter fulfillment period, and it may be more difficult to reach specification targets in the shorter period of time.

Planning system 273 can dynamically adjust flexibility attribute values over time based on one or more of the following: advertiser audience insights 215, broadcaster audience insights 231, Nielsen ratings 233, information from automated price and yield system 235, real time station and show content 237, and media attribution data 239. Media attribution data can be received from input to media attribution dashboard 241. In some embodiments, digital performance information 253 and information regarding spot air time 251 can be collected or otherwise obtained by media broadcaster 286 or another entity, and provided as media attribution information 255 to media attribution dashboard 241. Media attribution dashboard 241 can provide the media attribution data 239 to planning system 273 automatically, or based on input from media buyer 203, or otherwise. In various embodiments, flexibility attributes can be adjusted on a continuing basis, periodically, in response to receipt of updated dynamic inputs, or the like.

In various embodiments, planning system 273 can generate new schedules 221 periodically, on demand, or in response to occurrence of a trigger event. The new schedules 221 can include updated order-to-inventory associations based on modified flexibility attributes. For example, if media attribution data indicates that an order is not achieving targets indicated in the order's specification, the flexibility of that order can be decreased, which may mean an increase in the flexibility attribute value of that order. The new flexibility value can be used by planning system 273 to generate new associations, and to generate new schedules 221 including those associations. The new schedules can be transmitted to delivery system 275, which can choose the best creative to be used by new schedules 221 based on ad rotation rules, and transmit a completed log to media broadcaster 286 for broadcast. In some embodiments, delivery system 275 can also obtain and use real-time environment data 261 and real time station and show content 263 to choose an appropriate creative.

Figure 3:
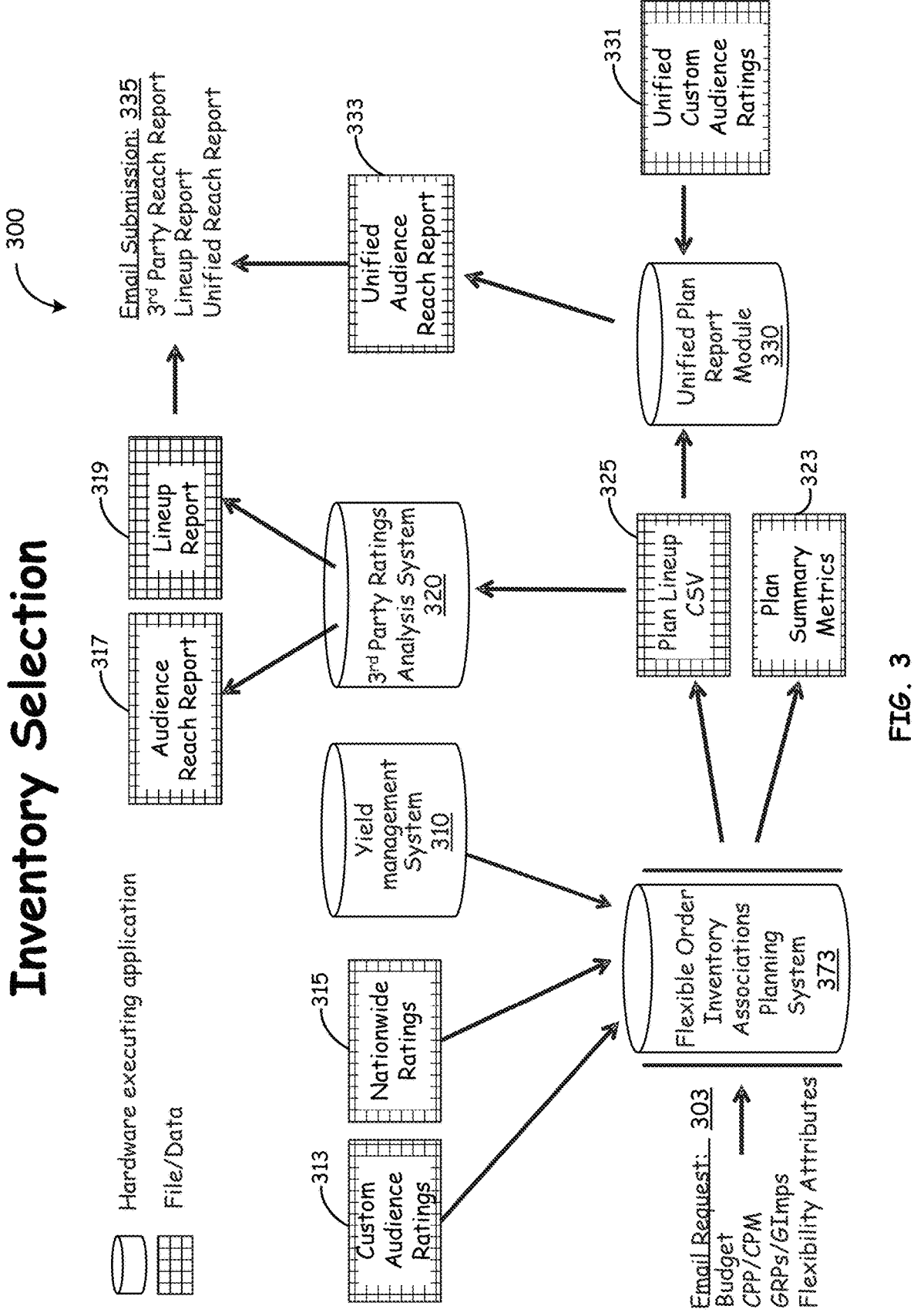
FIG. 3 is a diagram illustrating an inventory selection system, in accordance with various embodiments of the present disclosure.

Referring next to FIG. 3, a diagram illustrating an inventory selection system 300, will be discussed in accordance with various embodiments of the present disclosure. Inventory selection system 300 includes yield management system 310, planning system 373, ratings analysis system 320, and unified plan report module 330. Planning system 373 can receive an electronic request associated with a potential order, such as email request 303, from a media buyer. The electronic request can include budget information, information indicating target Gross Rating Points (GRP)/Gross Impressions (GImps), and target Cost Per Rating Point (CPP)/Cost Per Thousand (CPM), flexibility information, and/or similar information. Planning system 373 can obtain information such as custom audience ratings 313, nationwide ratings 315, and inventory availability and pricing information from yield management system 310. In at least one embodiment, the inventory availability information can include information identifying both booked and unbooked inventory, and flexibility attributes associated with the booked inventory. In at least one embodiment, the flexibility attributes associated with a booked inventory item can be indirectly associated with that inventory item through the inventory items association with a booked order's, flexibility attribute.

Planning system 373 can use the collection information to generate plan lineup 325, which in some embodiments takes the form of a comma separated value (CSV) file, although other file types can be used. Planning system 373 can also generate plan summary metrics 323 indicating an expected performance of plan lineup 325.

Plan lineup 325 can be delivered to ratings analysis system 320, which in some embodiments is a third party system used for independent analysis of the effectiveness of plan lineup 325, and to unified plan report module 330. Ratings analysis system 320 can generate audience reach report 317 and lineup report 319, while unified plan report module 330 can generate a unified audience reach report 333 based on plan lineup 325 and unified custom audience ratings 331. The two reports generated by ratings analysis system 320 and the report generated by unified plan report module 330 can be delivered to a media buyer, for example via email submission 335, which is transmitted to a media buyer in response to receipt of email request 303. The media buyer, using both the independent and unified reports included in email submission 335 can determine whether or not to book an order based on the plan lineup 325 generated by planning system 373.

Figure 4:
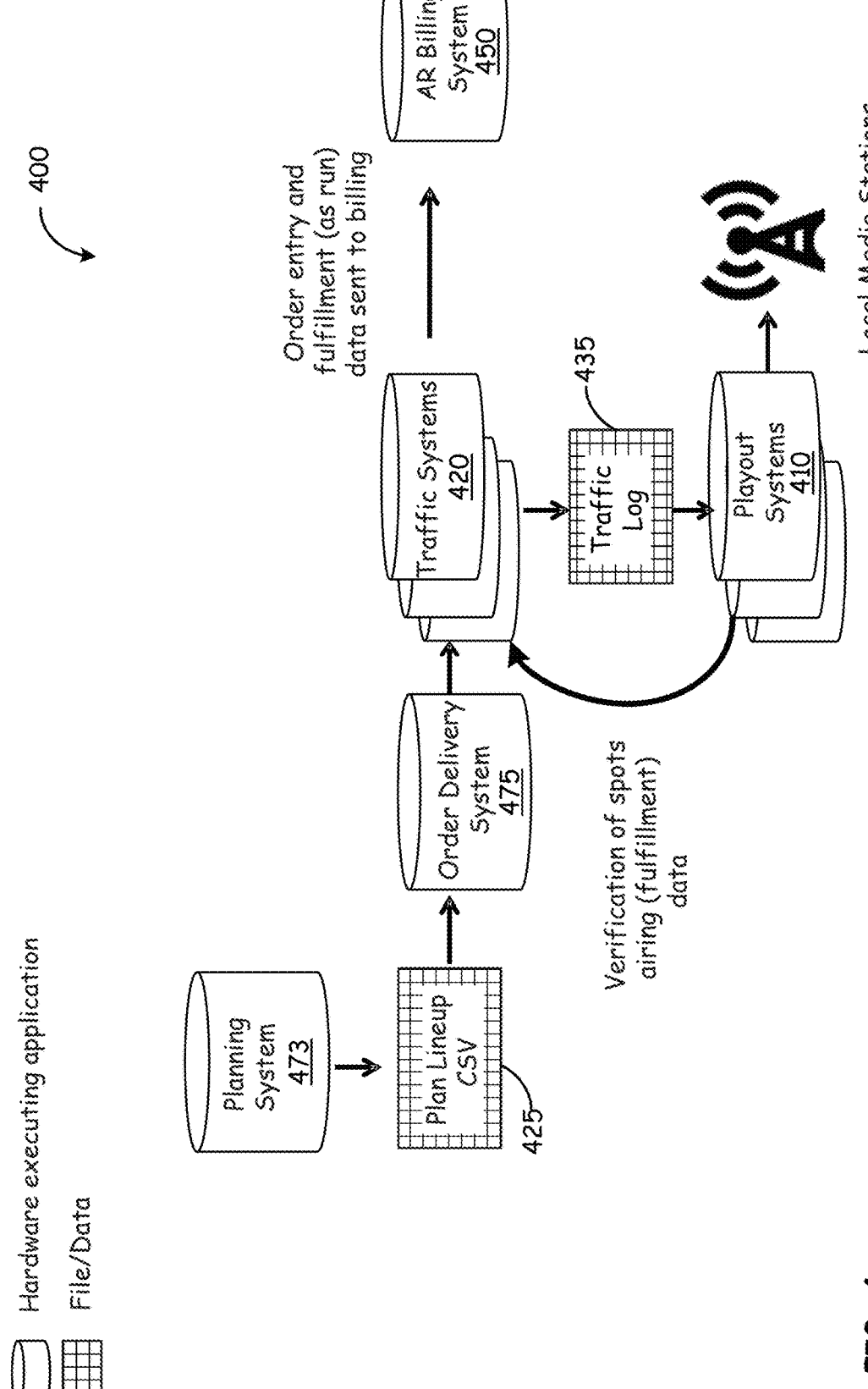
FIG. 4 is a diagram illustrating a traffic and billing workflow in a media broadcast system, in accordance with various embodiments of the present disclosure.

Referring next to FIG. 4, a diagram illustrating a traffic and billing workflow in a media broadcast system 400, will be discussed in accordance with various embodiments of the present disclosure. Media broadcast system 400 can include: planning system 473, which can associate orders to booked and unbooked inventory using dynamically varying flexibility attributes and generate a plan lineup 425; order delivery system 475, which can receive plan lineup 425 and split the plan lineup into station-specific orders, and transmit each order to the appropriate station; traffic systems 420, each of which can be associated with one or more media stations, and each of which can generate a traffic log 435 including an identification of spots scheduled for broadcast; playout systems 410, each of which can control and automate various media broadcast functions for its associated station; and a billing system 450, which can receive order entry and fulfilment information from each of the traffic systems 420 to generate invoices, process payments, and the like.

Referring next to FIG. 5, a diagram illustrating a submission summary chart 500, will be discussed in accordance with various embodiments of the present disclosure. Submission summary chart 500 can include order-specific information indicating performance of an order to date, which can be useful in allowing media buyers to evaluate order/plan performance.

Referring next to FIG. 6, a diagram illustrating a database schema 600 associating orders with inventory, will be discussed in accordance with various embodiments of the present disclosure. Database schema 600 can include Orders Table 610, Association Table 620, Inventory Table 630, and Order Attribute Table 640. Orders Table 610 includes information such as order ID 611, order name, advertiser name, order start and end date, target audience (audience cohort), desired number of impressions, an invoice amount, and the like. Inventory Table 630 includes information about an inventory item, for example an inventory ID 631, a station associated with the inventory, a Daypart of the inventory item, start and end times, spot price, spot length, a Booked indicator 633 identifying whether the inventory item is currently booked, and similar information.

Association Table 620 includes information such as order ID 621, inventory ID 622, association score 624, sometimes referred to herein as a flexibility attribute score, and association status 626. Association Table 620 can be used to establish the association between the order identified in order ID 611 of Orders Table 610 and the inventory item identified in Inventory ID 631 of Inventory Table 630. Association score 624 indicates that order number xyz456 has a 0.9 level of association with inventory item abc123. The level of association can also be referred to as a flexibility attribute value, and can be used to define a level of flexibility with which order number xyz456 and inventory item abc123 are associated.

In at least one embodiment, the flexibility attribute value, or the association score 624, can be used by a planning system to determine whether or not inventory item abc123 can be disassociated from order number xyz456, and re-associated with a different order. In various embodiments, a flexibility attribute score such as association score 624 can be determined based on one or more flexibility attributes included in an order, and altered over time to account for performance feedback, time remaining for order fulfillment, and the like. By altering the flexibility attribute score of an order associated with an inventory item, for example by changing the association score 624, removing a current association can be made more or less likely.

Order Attribute Table 640 can include multiple attribute IDs 641, 642, and 643, multiple Order IDs 644, 645, and 646, multiple Order Types 647, 648, and 649, multiple Order Keys 651, 653, and 655, and multiple Order Values 665, 667, and 669. As illustrated in database schema 600, there are three different types of order attributes: Flexibility Type 647, Restriction Type 648, and Target Type 649. At the Flexibility Type 647 and Restriction Type 648 can be considered flexibility attributes. For example, Order Attribute Table 640 indicates that order number xyz456 is flexible with regard to week, as shown by Order Key 651, and any week can be chosen, as shown by Order Value 665. Conversely, Order number xyz456 is not flexible with regard to station, as shown by Order Key 653; instead, it is restricted to station 123, as shown by Order Value 667.

Target type 649 is slightly different from Flexibility Type 647 and Restriction Type 648, because it references the occurrence of an event. More specifically, order xyz456 is targeting a weather event, as shown by Order Key 655, and more specifically Rain, as shown by Order Value 669. Thus, in the illustrated embodiment, association of order number xyz456 to an inventory item can be delayed until a weather report indicates that it is raining, or has recently rained, in a location served by station 123. Once a rain event is identified, during any week between Apr. 15, 2016 and Dec. 15, 2016, order xyz456 can be associated with inventory item abc123 with a 0.9 flexibility attribute value.

Referring next to FIG. 7, a table 700 illustrating booked and unbooked inventory, along with flexibility attributes associated with the inventory, will be discussed in accordance with various embodiments of the present disclosure. Table 700 illustrates that both booked and unbooked inventory can be considered by a planning system when dynamically re-associating orders to inventory. Each cell in Table 700 represents a day part on a particular station, and shows a flexibility attribute value, between 0 and 1, of an order associated with that combination of day part and station. A zero can be used to indicate complete flexibility, and any illustrated day part/station combination that is not yet associated with an order can be set to have a flexibility attribute value of 0.

Figure 8:
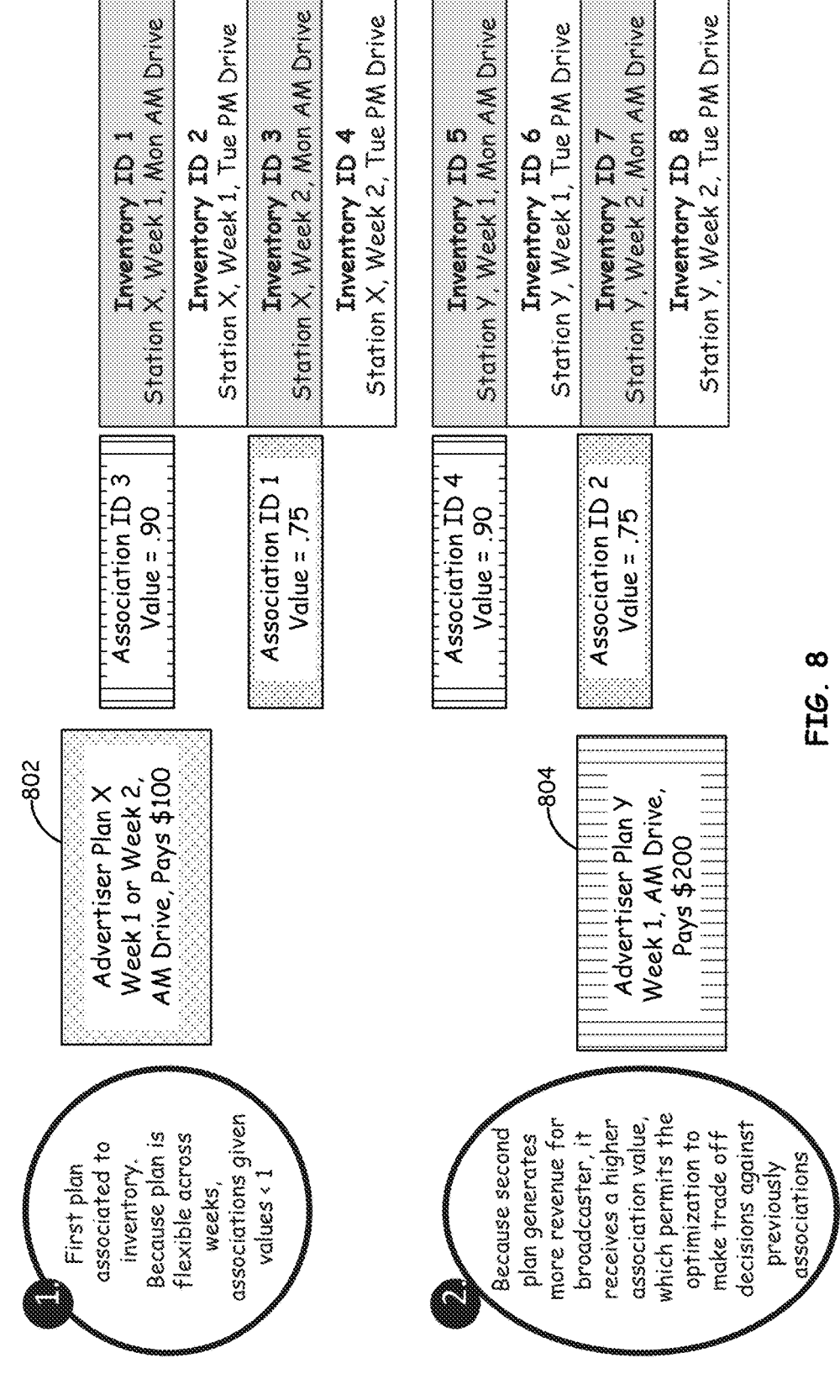

Referring next to FIG. 8-12, various order-to-inventory association scenarios, will be discussed in accordance with various embodiments of the present disclosure. Referring to FIG. 8, scenario 800 illustrates weighted associations, and optimization against already booked inventory. Scenario 800 involves two orders, or plans: Plan 802, which is flexible across weeks, and with regard to station, but is not flexible regarding daypart, which is designated as AM drive; and Plan 804, which is not flexible with regard to either week or daypart, but is flexible with regard to station.

Plan 802 can be associated with inventory ID 3 and inventory ID 7, as shown by Association ID 1 and Association ID 2. Inventory ID 3 is in the AM drive daypart of Week 2 on station X, and inventory ID 7 is in the AM drive daypart of Week 2 on station Y. Similarly, Plan 804 can be associated with inventory ID 1 and inventory ID 5, as shown by Association ID 3 and Association ID 4. Inventory ID 1 is in the AM drive daypart of Week 1 on station X, and inventory ID 5 is in the AM drive daypart of Week 1 on station Y.

In previous systems, Plan 802 might have been booked into the AM Drive slots on station X, i.e., Inventory ID 1 and Inventory ID 3. If so, Plan 804 could not have been accommodated based on the requirement to air during week 1 AM Drive, because there would have been only a single AM Drive slot open during week 1, namely Inventory ID 5. However, because flexibility attribute values, or association ID values, are used in various embodiments, at least some booking conflicts can be avoided. Furthermore, because various embodiments employ dynamic optimization of associations, even if the initial assignment of Plan 802 to inventory items caused a conflict, that conflict could be resolved by re-associating Plan 802 with different inventory items.

Figure 9:
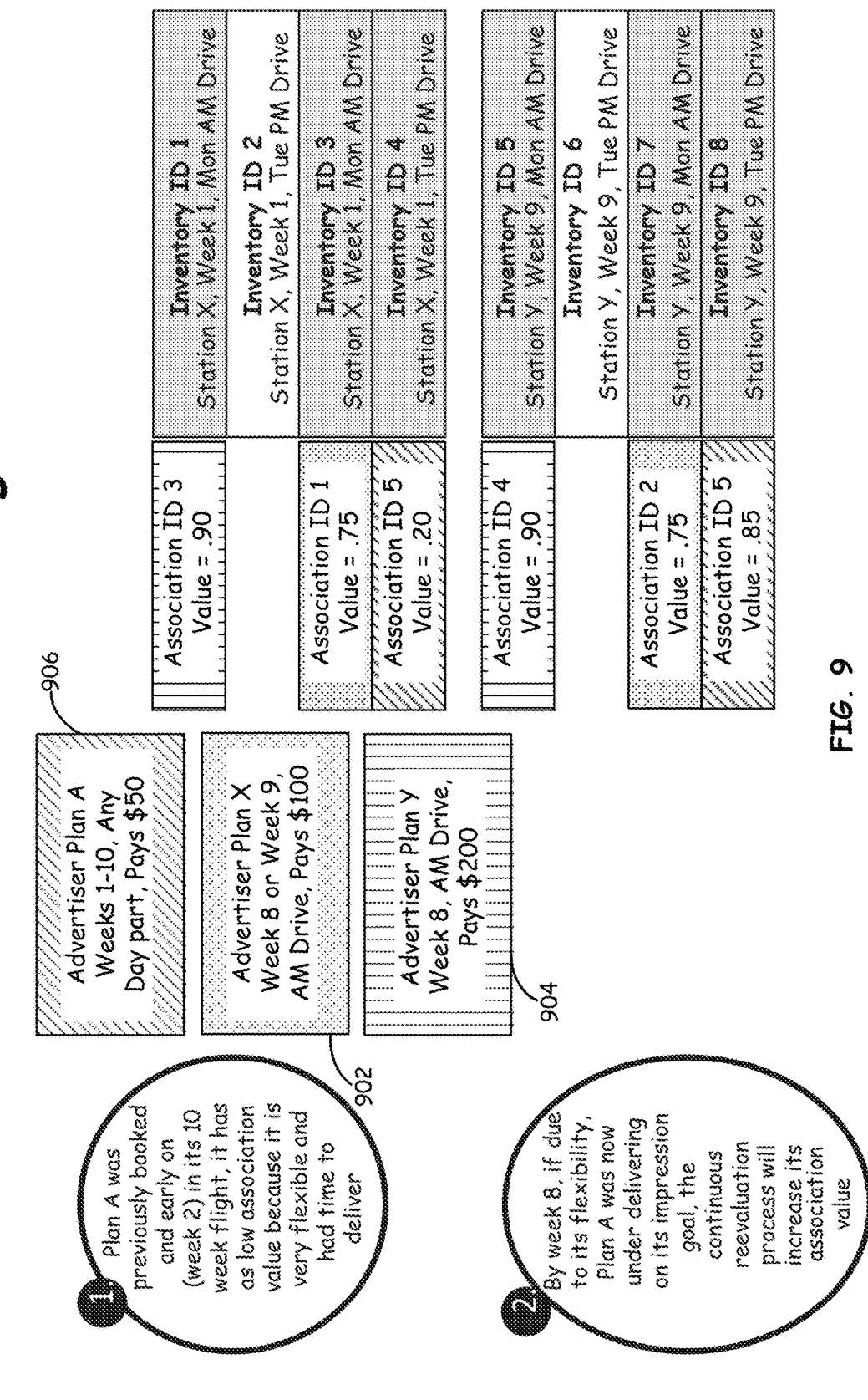

Referring to FIG. 9, Scenario 900, continuous optimization and reevaluation of association for pacing is illustrated. Scenario 900 involves Plan 906, Plan 902, and plan 904. As illustrated, Plan 906 is flexible with regard to daypart, week and station, and is scheduled to run for 10 weeks. Plan 902 is not flexible on daypart, and must run during a two week period. Thus, Plan 902 is only somewhat flexible on week. Plan 904 must run during a single week during AM drive, and is thus not flexible on week or daypart. Because Plan 906 has a long period of fulfillment, during the early weeks of the 10-week period the planning system can assign Plan 906 a low association, or flexibility attribute value, making the association between Plan 906 and Inventory ID 4 less "sticky," and making it easier to replace the association with Plan 906 with a different plan having a higher association value. Recall that in this embodiment a higher association or flexibility value indicates less flexibility.

Assuming for purposes of this example that during weeks 1-8 Plan 906 did not deliver the expected number of impressions, during week 9 the Association ID value of Plan 906 can be increased to make it more difficult to replace an association of Plan 906 to an inventory item.

Figure 10:
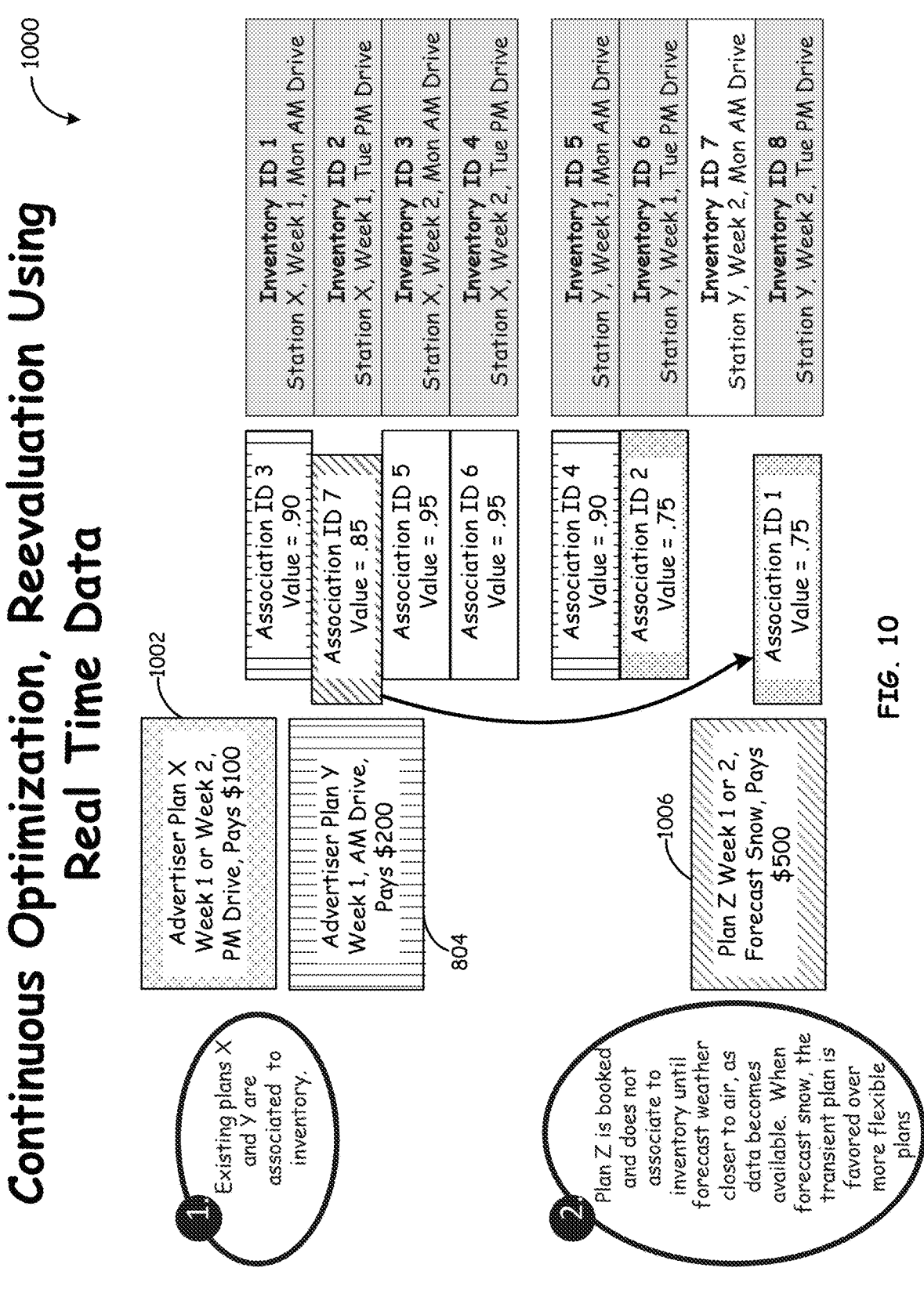

Referring to FIG. 10, Scenario 1000, continuous optimization and reevaluation of associations based on real time data is illustrated and discussed. Scenario 1000 involves Plans 1002, 804, and 1006. Plans 1002 and 804 are associated to inventory as previously discussed. However, the planning system can delay association of Plan 1006 until occurrence of a specified event, i.e., the forecast of snow.

Figure 11:
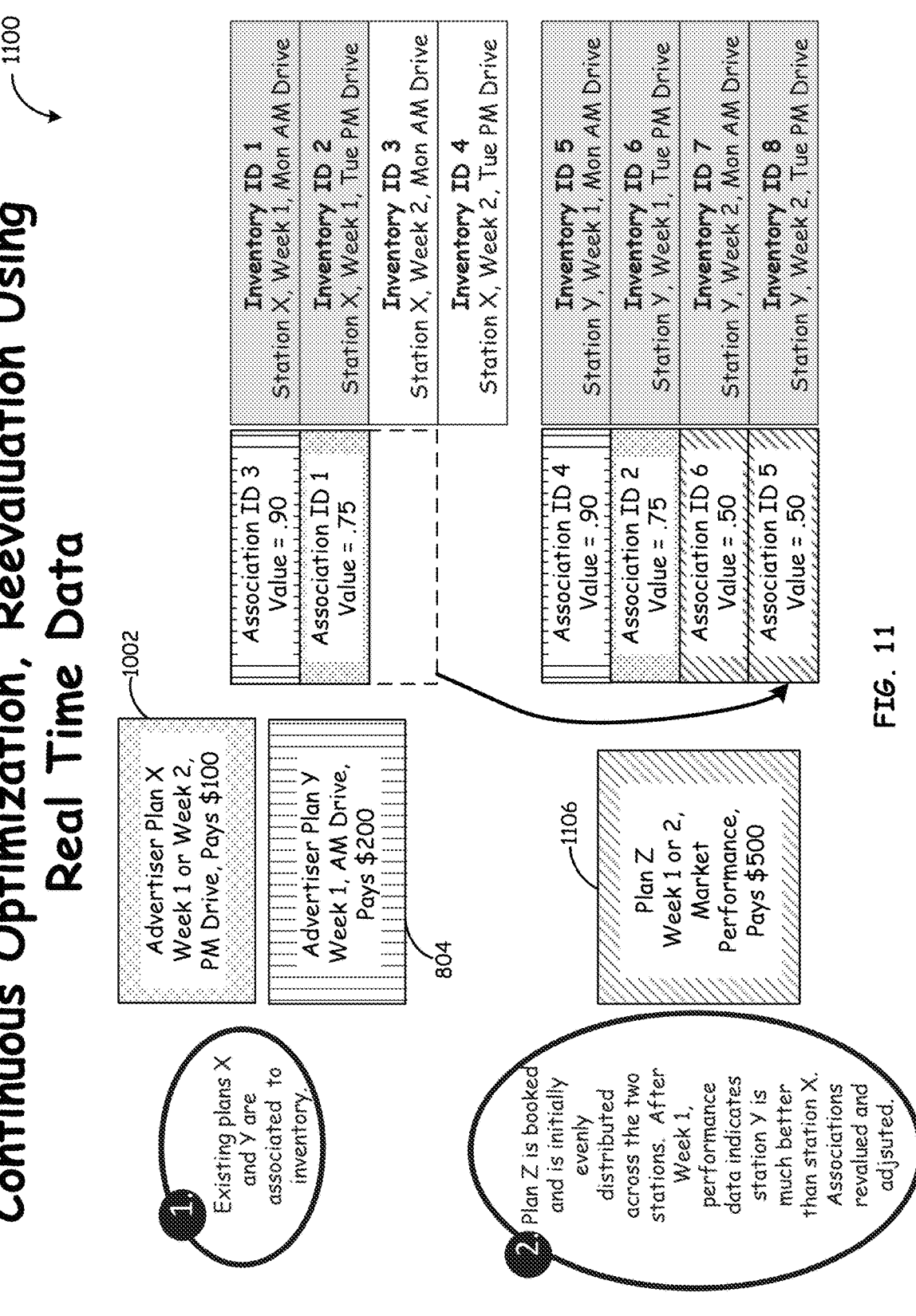

Referring next to FIG. 11, Scenario 1100, which is another example of continuous optimization and reevaluation of associations based on real time data, is discussed. In Scenario 1100, Plans 1002, 804, and 1106 are each initially associated to inventory. However, after week 1 performance data received at the planning system, for example from a broadcasting system, a third party monitoring system, a media automation system, a traffic and billing system, or the like, indicates that moving Plan 1106 to another station would be more likely to satisfy plan requirements. In response to making the determination that Plan 1106 should be moved to another station, Plan 1106 is disassociated from Inventory ID 3, and moved to Inventory ID 8.

Referring next to FIG. 12, Scenario 1200, which illustrates employing flexibility attribute values to schedule stand-by orders for last minute unsold inventory is discussed. Plans 1002 and 804 are associated to inventory, while Plan 1206 is booked, but association to inventory is delayed until occurrence of an event, namely the identification of unsold inventory within a threshold period of time prior to air time. Thus, if unbooked inventory is identified, for example, three hours before air time, Plan 1206 can be booked to take advantage of that inventory.

Figure 13:
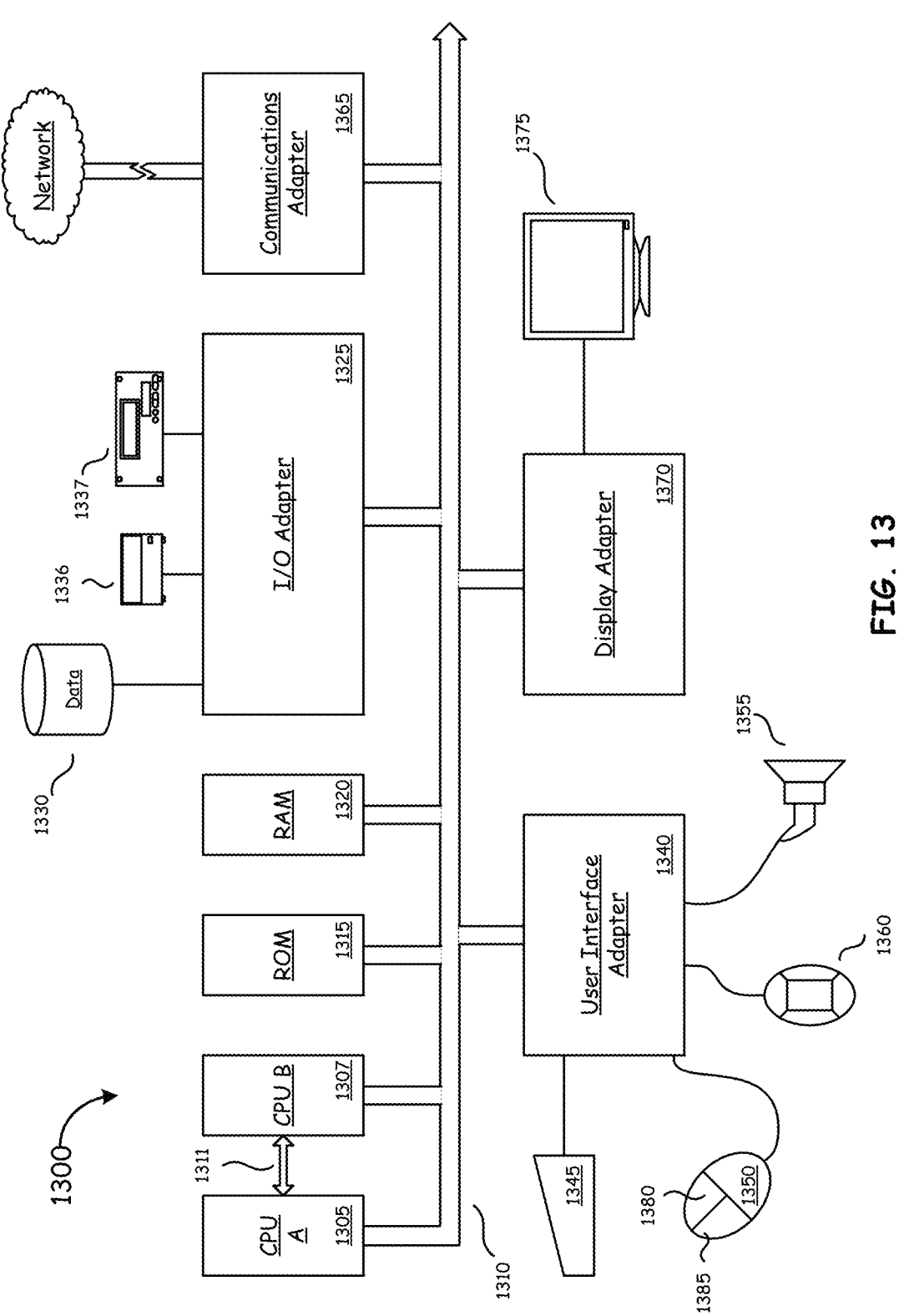
FIG. 13 is a high-level block diagram of a processing system, part or all of which can be used to implement various servers, machines, systems, and devices in accordance with various embodiments of the present disclosure.

Referring now to FIG. 13, a high-level block diagram of a processing system is illustrated and discussed, according to various embodiments of the present disclosure. Processing system 1300 includes one or more central processing units, such as CPU A 1305 and CPU B 1307, which may be conventional microprocessors interconnected with various other units via at least one system bus 1310. CPU A 1305 and CPU B 1307 may be separate cores of an individual, multi-core processor, or individual processors connected via a specialized bus 1311. In some embodiments, CPU A 1305 or CPU B 1307 may be a specialized processor, such as a graphics processor, other co-processor, or the like.

Processing system 1300 includes random access memory (RAM) 1320; read-only memory (ROM) 1315, wherein the ROM 1315 could also be erasable programmable read-only memory (EPROM) or electrically erasable programmable read-only memory (EEPROM); input/output (I/O) adapter 1325, for connecting peripheral devices such as disk units 1330, optical drive 1336, or tape drive 1337 to system bus 1310; a user interface adapter 1340 for connecting keyboard 1345, mouse 1350, speaker 1355, microphone 1360, or other user interface devices to system bus 1310; communications adapter 1365 for connecting processing system 1300 to an information network such as the Internet or any of various local area networks, wide area networks, telephone networks, or the like; and display adapter 1370 for connecting system bus 1310 to a display device such as monitor 1375. Mouse 1350 has a series of buttons 1380, 1385 and may be used to control a cursor shown on monitor 1375.

It will be understood that processing system 1300 may include other suitable data processing systems without departing from the scope of the present disclosure. For example, processing system 1300 may include bulk storage and cache memories, which provide temporary storage of at least some program code in order to reduce the number of times code must be retrieved from bulk storage during execution.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

16

What is claimed is:

1. A method for use in a data storage and retrieval system for a computer memory, the method comprising:
generating a first table according to a database schema employing weighted associations, the first table storing first information;
generating a second table according to the database schema employing weighted associations, the second table storing second information; and
generating a third table according to a database schema employing weighted associations, the third table storing a weighted association establishing a flexible link between the first information stored in the first table and the second information stored in the second table.

2. A data storage and retrieval system for a computer memory, the data storage and retrieval system comprising:
a memory; and
a processor coupled to the memory, the processor configured to generate a database in accordance with a database schema employing weighted associations, and store the database in the memory, wherein generating the database in accordance with the database schema includes
generating a first database table storing first information,
generating a second database table storing second information, and
generating a third database table storing a weighted association establishing a flexible link between the first information stored in the first database table and the second information stored in the second database table.

3. An improved data storage and retrieval system for a computer memory, wherein the improvement comprises:
configuring the computer memory according to a database schema employing weighted associations, each weighted association establishing a flexible link between information stored in a plurality of different tables.

4. The improved data storage and retrieval system of claim 3, wherein each weighted association indicates a degree of flexibility of the flexible link.

5. The improved data storage and retrieval system of claim 3, wherein the database schema specifies storing the weighted associations in association tables different from the plurality of different tables.

6. The improved data storage and retrieval system of claim 5, wherein the database schema specifies storing, in the association table, information identifying other tables to which the flexible link applies.

7. The improved data storage and retrieval system of claim 6, wherein the database schema specifies storing information restricting application of the flexible link in at least one of the other tables.

8. The improved data storage and retrieval system of claim 7, wherein the database schema specifies storing at least a portion of the information restricting application of the flexible link in a restriction-type field included in one of the other tables.

9. The data storage and retrieval system of claim 2, wherein the weighted association indicates a degree of flexibility of the flexible link.

10. The data storage and retrieval system of claim 2, wherein the processor generates the database in accordance with a database schema by storing, in the third database table, information identifying other tables to which the flexible link applies.

11. The data storage and retrieval system of claim 10, wherein the processor generates the database in accordance with a database schema by storing information restricting application of the flexible link in at least one of the first database table or the second database table.

12. The data storage and retrieval system of claim 11, wherein the processor generates the database in accordance with a database schema by storing at least a portion of the information restricting application of the flexible link in a restriction-type field included in the at least one of the first database table or the second database table.

13. The method of claim 1, wherein the weighted association indicates a degree of flexibility of the flexible link.

14. The method of claim 1, wherein generating the third table according to the database schema employing weighted associations includes storing, in the third table, information identifying other tables to which the flexible link applies.

15. The method of claim 14, wherein generating the first table according to the database schema employing weighted associations includes storing information restricting application of the flexible link in the first table.

16. The data storage and retrieval system of claim 15, wherein generating the first table according to the database schema employing weighted associations includes storing at least a portion of the information restricting application of the flexible link in a restriction-type field included in the first table.

* * * * *